April 9, 1957 R. E. RUCKSTAHL ET AL 2,787,909
CONTROL APPARATUS
Filed Oct. 27, 1950 5 Sheets-Sheet 1

INVENTORS
Robert E. Ruckstahl &
Robert S. Lackey.
BY
Paul E. Friedemann
ATTORNEY April 9, 1957   R. E. RUCKSTAHL ET AL   2,787,909
CONTROL APPARATUS
Filed Oct. 27, 1950   5 Sheets-Sheet 2
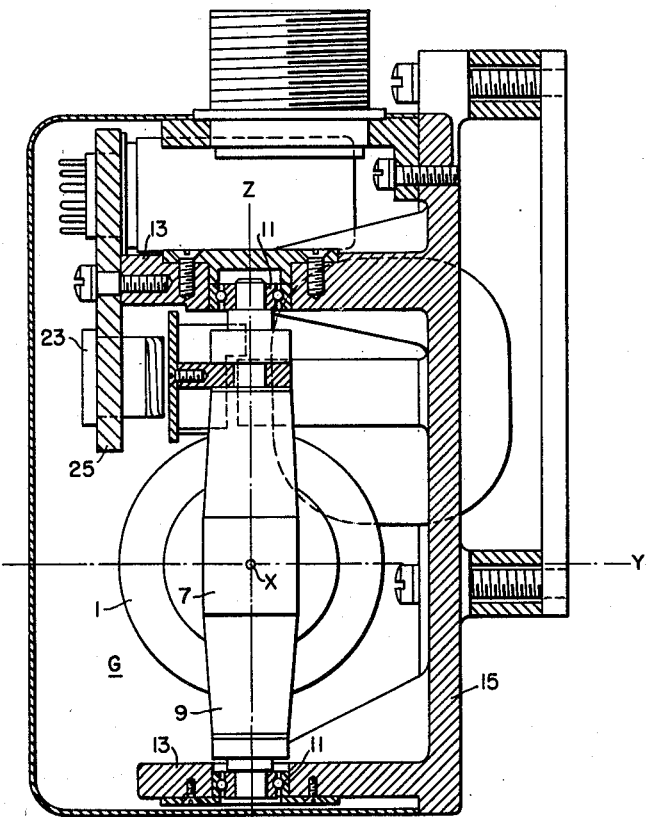
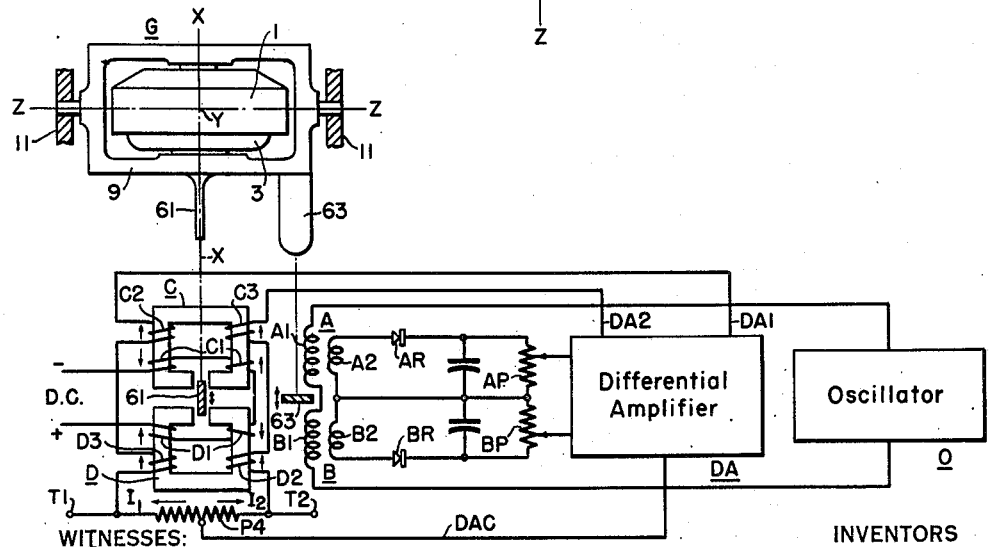
INVENTORS
Robert E. Ruckstahl &
Robert S. Lackey.
BY
ATTORNEY

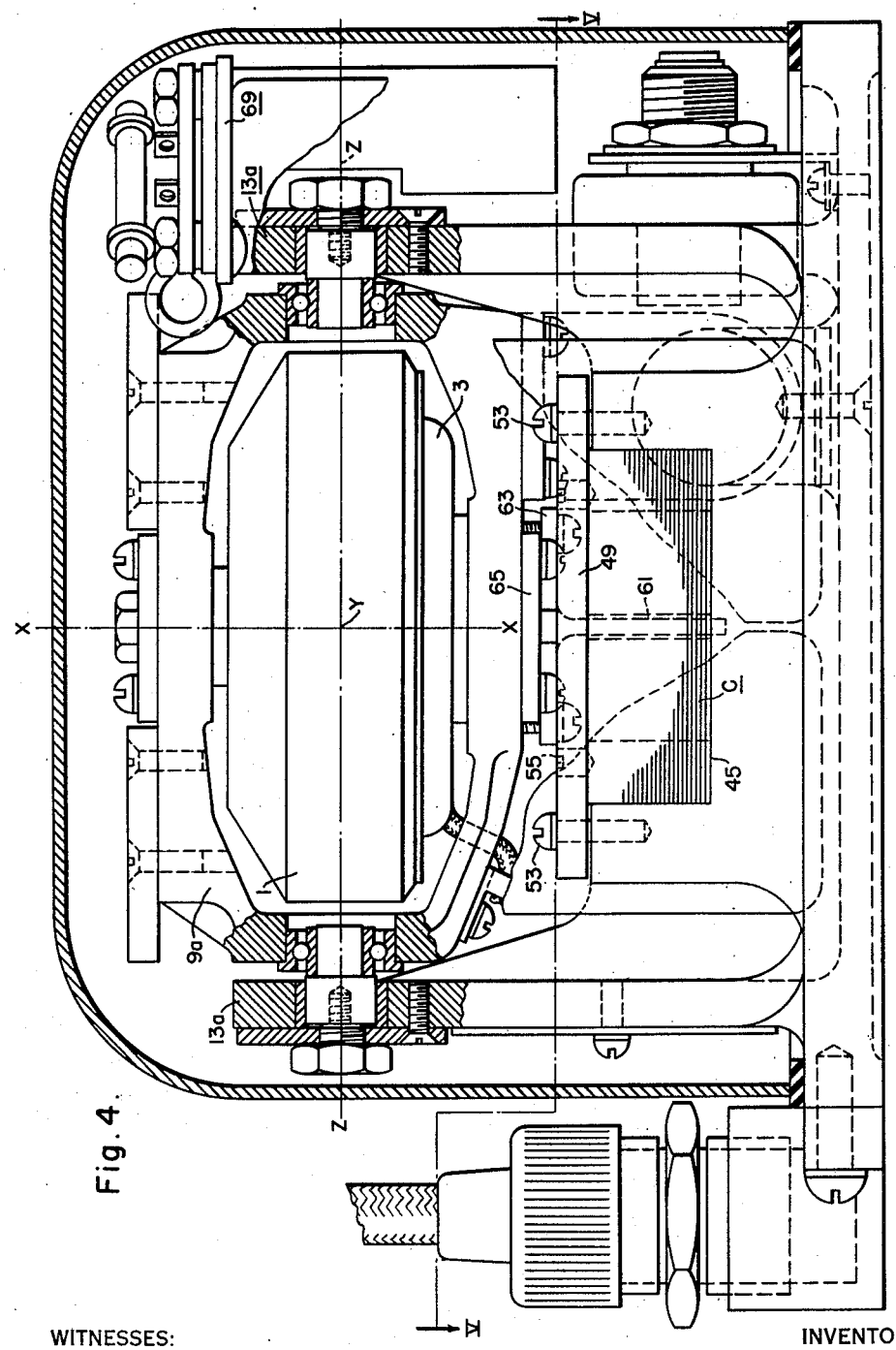

INVENTORS
Robert E. Ruckstahl &
Robert S. Lackey.

United States Patent Office 2,787,909
Patented Apr. 9, 1957

2,787,909

CONTROL APPARATUS

Robert E. Ruckstahl and Robert S. Lackey, Pittsburgh, Pa., assignors to Westinghouse Electric Corporation, East Pittsburgh, Pa., a corporation of Pennsylvania Application October 27, 1950, Serial No. 192,407

11 Claims. (Cl. 74—5.4)

This invention relates generally to apparatus responsive to physical quantities and more in particular to an apparatus responsive to angular rates of movement of a body about a given axis.

The apparatus herein disclosed and illustrated in the drawings embodies an angular rate sensitive gyroscope. Rate gyroscopes as distinguished from position gyroscopes, having three degrees of freedom, have but two degrees of freedom, one of which is constituted in the spin axis of the gyroscope rotor and the remaining one, lying at right angles to the spin axis and being defined by the journals of the gimbal in which the rotor is journalled, constituting the output axis of the gyroscope. This axis is frequently referred to as the precession axis. The input axis of such a gyroscope normally occupies a position substantially perpendicular to both the spin and output axis thereof; that is, approximately perpendicular to the plane defined by the two mentioned intersecting axes, and is constituted in the axis about which the body, the angular rate of which is to be detected, rotates. Depending upon the application, the input axis may be coincident with or radially displaced and parallel to the axis about which the body rotates.

When oriented upon a rotatable body as above described, angular velocity of the body about the given axis of freedom results in the application of a torque about the input axis of the rate gyroscope. This torque and resulting angular displacement of the gimbal journalling the rotor, displaces the plane of the rotor. The resulting dynamic reaction of the rotating system to this angular displacement is in an angular direction tending to align the rotor spin vector with the input torque vector, producing a torque about the gimbal or output axis. This last mentioned torque, which may be referred to as output torque or precessional torque, is proportional to the angular rate about the input axis and, therefore, is a measure of angular rate of the body about the given axis. The rate gyroscope system is additionally direction sensitive; that is, angular input rates in one direction result in output torque in a given direction about the output axis, depending upon the direction of rotation of the gyroscope rotor. Reversal of the output torque occurs when the direction of input torque is reversed.

This angular velocity sense of the rate gyroscope is usable in different ways, one important application is in the detection of angular velocity about a given control axis of an aircraft. When so employed, the output torque, which is a measure of velocity error, may be utilized through a suitable pick-off device and servo-mechanism, responsive to the pick-off device, to control the corresponding control surface, or other movement controlling device of the aircraft, to reduce the velocity error to zero. Suitable feedback of control surface position and/or rate of movement introducing counter torques about the output axis of the gyroscope, completes a closed loop regulating system which regulates for zero velocity error about the given control axis of the aircraft.

In the application of the rate gyroscope of this invention, it was desired to obtain a true indication of the angular velocity about the input axis with a degree of accuracy of a higher order than an application as above described requires. Such an application is represented in target-tracking equipment wherein the angular velocity of a sighting device tracking a moving target must be determined along with other parameters of the geometric system with a high degree of accuracy. In the specific application to gun-fire control systems, this angular velocity, together with the instantaneous value of range, are factors determining the lead angle, for example, of a gun.

From this brief reference to fire control systems, it will be appreciated that the determination of instantaneous angular velocities must be accomplished with a minimum of time delay, and that the derived physical quantity, whether it be a gyro force or torque, or the instantaneous angular position of the gyro about its output axis (if the gyro is restrained), or an electrical quantity produced by a gyro control device, must accurately represent the instant angular rate and direction of the sighting device.

In achieving this end, it is important that the gyro have low inertia about its output axis; that is, the mass of the gimbal assembly and other attachments moving therewith through which biasing torques may be applied and output torques and/or angular position about the output axis may be determined, should be as small as practical considerations permit so that minimum delay in response to available gyrodynamic or precession torques may be realized. Likewise, any electrical system, including an electrical pick-up or pick-off device responsive to gyro output torque or position should have a minimum of time delay in the production of its angular velocity indicating electrical quantity. Time delays at this point, complicate system calibration and more importantly may introduce system errors which are beyond acceptable levels. It is also important to have the moving system of the gyroscope statically balanced about the output axis inasmuch as an unbalance about this axis will introduce an erroneous torque dependent in magnitude upon the magnitude of the input angular rate and the geometric location of the unbalance.

Of the several methods practiced in the measurement of physical quantities, it is preferred that that method be employed wherein, in general, a force or torque and/or resulting displacement is produced by a device in dependence of the given physical quantity, and utilized to produce a quantity which is converted to a force or torque applied to said device in opposition to said first-named force or torque to establish a condition of equilibrium of forces in the device, the quantity thus produced indicating the magnitude and direction of the physical quantity to be measured.

In practicing this invention, the angular displacement of the rate gyro about its output axis is utilized to produce an electrical quantity which, through suitable circuit means including electromagnetic biasing means for applying biasing torques about the gyro output axis, is utilized to produce torques opposing the output or precession torque, which electrical quantity, upon the establishment of torque equilibrium is indicative of the angular velocity about the rate gyro input axis, and may, therefore, be applied as one of several control quantities to a gun pointing system.

While several objects of this invention are apparent in the general considerations hereinabove made, the main objects are briefly summarized as follows:

An important object of this invention is to provide gyroscopic apparatus which is simple in its elements with respect to operational requirements and positive in operation.

Another object of this invention is to provide a rate gyroscope assembly which is small and compact and which may be easily manufactured.

A further object of this invention is to provide a rate gyroscope assembly which includes means for applying linear biasing torques about the output axis thereof.

More specifically stated, it is an object of this invention to provide a rate gyroscope assembly having a biasing magnet system in which the magnetic forces are independent of the position of the relatively movable parts of the biasing magnet.

Yet a further object of this invention is to provide an apparatus responsive to and/or for measuring angular velocities.

Further, to the preceding object, it is also an object of this invention to provide an apparatus of the class referred to which is inherently fast in response; that is, responds with a minimum of time delay.

Still further, it is an object of this invention to provide such an apparatus having a low threshold of response.

The foregoing statements are merely illustrative of the various aims and objects of this invention, other objects and advantages will become apparent upon a study of the following disclosure when considered in conjunction with the accompanying drawings, in which:

Fig. 3 is a sectional view of the gyroscope assembly illustrated in Fig. 1, taken on the section line III—III;

Fig. 4 is a side view fragmentarily in section of a gyroscope assembly representing a preferred embodiment of this invention;

Fig. 7 is a schematic illustration of an angular rate measuring system embodying a rate type gyroscope as the angular rate sensing element.

Figure 1:
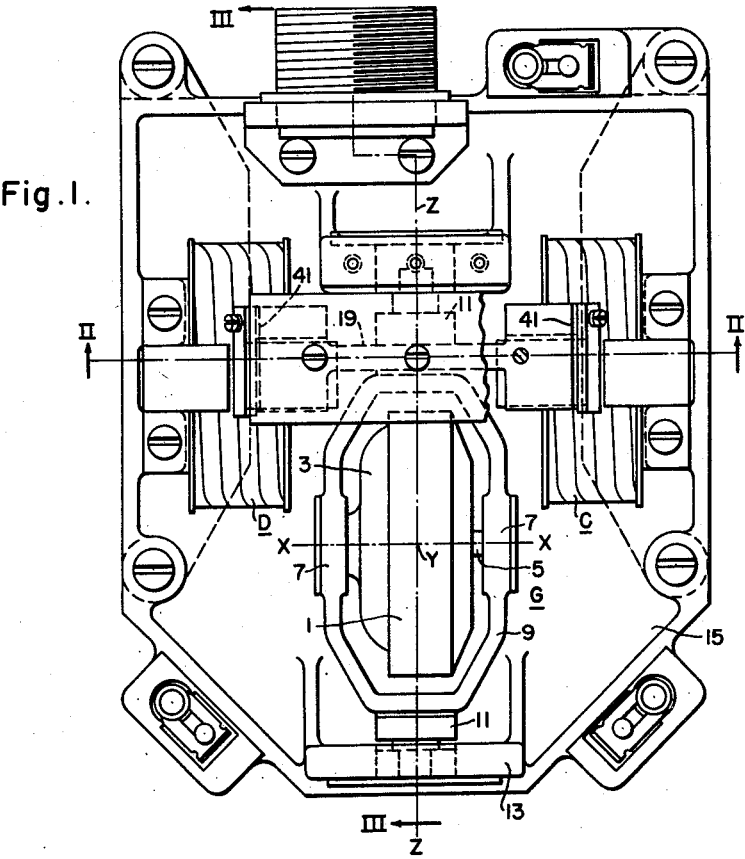
Figure 1 is a top view with the cover removed and certain parts broken away of a gyroscope assembly embodying the principles of this invention.
Figure 2:
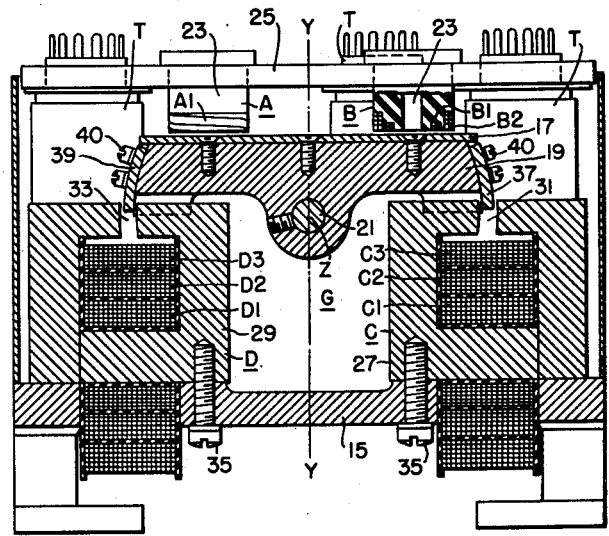
Fig. 2 is a sectional view taken on the line II—II of Fig. 1.

Referring to that embodiment of this invention illustrated in Figs. 1 through 3, the rate gyroscope assembly therein illustrated includes a rate gyroscope generally designated G. This rate gyroscope includes a rotor 1 constituting the rotating element of a motor having a stator 3. This motor is of the hysteresis type, and is particularly adapted for operation on the 400 cycle electrical power supply normally available on aircraft. This rotor, while not specifically illustrated is essentially cup-shaped, and surrounds the stator 3, thus providing a gyroscope assembly of maximum inertia for its specific size. When energized with 400 cycle power, the rotor 1 is designed to operate at about 12,000 revolutions per minute. The rotor 1 is mounted upon a shaft 5, which is journalled in bearings 7 on opposite sides of a gimbal 9 which straddles the complete gyroscope assembly, stator 3 being stationarily secured to the left side of the gimbal as seen in Fig. 1. The gimbal 9 is journalled in suitable bearings 11 at its opposite extremities defining an axis designated Z—Z which is displaced 90° from the axis designated X—X which is the axis of spin of the rotor 1. Bearings 11 are mounted in suitable bearing supports 13, forming a part of a base 15 for mounting the gyroscope assembly. Additional structural details of the gyroscope G may be noted by reference to U. S. Patent 2,416,300 of F. W. Godsey, Jr., assigned to the assignee of this invention.

From the geometry of the system as thus far described, it will be appreciated that with respect to the base 15, the gyroscope assembly has two degrees of freedom, namely, freedom of rotation for the rotor about the spin axis X—X and freedom for angular movement of the gimbal and rotor about the gimbal axis Z—Z which is 90° displaced from the spin axis X—X. The gimbal axis Z—Z is the axis about which the precession torque is produced in response to an input torque constituted in an imaginary axis Y—Y which is perpendicular to the plane defined by the intersection of the axis X—X and Z—Z. Rotation of the complete assembly, including the base, about the input axis Y—Y, results in displacement of the plane of the rotor of the gyroscope producing a torque about the output or precession axis Z—Z in a direction tending to align the spin vector of the rotor with the input torque vecor about the axis Y—Y. Thus, a velocity sense exists, and the torque which is produced about the axis Z—Z accurately represents the angular velocity about the input axis Y—Y.

As earlier noted in the opening statements of this disclosure, the angular velocity about the input axis is to be determined by an electrical quantity which is initiated in a suitable device responsive to angular displacement about the output axis Z—Z and which is utilized to oppose, through suitable torque producing means, the output torque of the gyroscope. In the illustrations of Figs. 1 through 3, the device which is responsive to angular displacement is represented in the transformers designated A and B (see Fig. 2). These transformers are preferably of the high frequency type; that is, adaptable for excitation by radio frequency alternating currents. These transformers comprise in each case, a pair of concentrically disposed coils or windings, which as illustrated in connection with the sectional illustration of transformer B are designated B1 and B2, constituting respectively, the primary and the secondary windings thereof. The transformer A similarly comprises primary and secondary windings which are respectively designated A1 and A2 in the schematic illustration of Fig. 7.

The impedances of the transformers A and B are varied in opposite senses as a function of the angular displacement of the gyroscope about its output axis by means of a nonmagnetic plate 17 of electrical conducting material. This plate is secured to a suitable beam 19 which in turn is secured to the shaft 21 at one end of the gimbal 9 to rotate with the gimbal. Upon rotation of the gimbal, it will be appreciated that one end of the plate 17, for example, the left end as viewed in Fig. 2 if the rotation of the gimbal is clockwise, will move closer to the transformer A, while at the same time, the right-hand end of this plate will move a corresponding distance away from the transformer B. The principle involved in this impedance control is similar to that resulting from a single turn short-circuited coil. The eddy currents induced in the plates 17 beneath each of the transformers by flux linkage of the respective transformers therewith, set up a flux in opposition to the transformer flux or magnetic field thereby tending to lower the effective impedance of the respective transformers depending upon the magnitude of this eddy current produced magnetic field. Thus, it will be appreciated that the density of this countermagnetic field increases as the plate moves closer to a given transformer. As a result, the effective impedance of this transformer is diminished and as a consequence, its voltage is correspondingly diminished. The reverse condition simultaneously exists with respect to the other transformer. Thus, a voltage difference between the transformers is produced, which voltage difference may be utilized through suitable instrumentalities to control the biasing torque which is applied about the output axis Z—Z of the gyroscope.

Radio frequency transformers of the type herein illustrated are preferred primarily because of their low time delay in response to the changes in electrical conditions. As earlier noted, it is essential that system time delays be kept to a minimum. Thus, the transformers A and B are of the air core type and are wound upon suitable supports 23 of electrical insulating material and nonmagnetic material. Each of the transformers is supported on a bar 25 which is secured to the upper extremity of the bearing support 13 adjacent the end of the gimbal at which the beam 19 is mounted. In Fig. 1, this bar 23 has been removed in an effort to clarify the illustration of certain other parts appearing therein.

Torques are applied about the gimbal axis Z—Z by means of an electromagnetic biasing system including the electromagnets C and D which appear in section in Fig. 2. These electromagnets each comprise a core of generally C-shaped configuration, the core of electromagnet C being designated 27 and the core of the electromagnet D being designated 29. Each core is provided with a radial airgap, the airgaps being respectively designated 31 and 33 and the cores are secured to the base 15, by means of screws 35, in symmetrical positions on opposite sides of the axis Z—Z of the gyroscope, in such a position that the radial airgaps 31 and 33 are equally radially spaced from the axis Z—Z. The arcuate faces of the airgaps 31 and 33 are concentric; that is, the corresponding faces are defined by equal radii about the axis Z—Z.

The respective armatures for the electromagnets C and D are designated 37 and 39. These armatures are each of the form of curved plates whose curvatures are defined by the arc of the circle at their points of mounting at the extremities of the beam 19. These armatures are carefully positioned to follow an arcuate path transversely through the respective radial airgaps 31 and 33, and are supported in such a position that with the gyroscope in its neutral position, corresponding lengths of the bottom edges of each of the armatures, as viewed in Fig. 2, project into the associated radial airgaps 31 and 33. The armatures are secured to the extremities of the beam 19 by means of screws 40 which thread into the armature seating faces 41 which are formed at the extremities of the beam 19. As thus positioned, upon tilting of the gyroscope about its output axis, the armatures 37 and 39 move transversely of the respective airgaps 31 and 33 and these movements are in opposite senses.

With such an arrangement, it will be observed that the length of the airgaps defined between the confronting faces of the cores and armatures are not varied, and as a consequence, there is no variation in flux in the respective magnetic circuits as a result of armature displacement. The only variation which occurs is that in the amount of overlap of the core by the armatures which at best can result only in second order effects due to small variations in the leakage flux. For all practical purposes, the magnetic forces exerted upon the armatures by the magnetic flux of the cores may be regarded as independent of the actual displacement of the armatures with respect to the cores, and the magnetic pull is, therefore, linear with respect to the differential current which is circulated in the control windings or coils of the electromagnet.

Inasmuch as a direction sense is required in the magnetic biasing torques which are applied about the gimbal axis Z—Z, means are provided for imparting directivity to the control afforded by the biasing magnets. To this end, each of the magnets is provided with a plurality of coils. The coils on the core 27 are respectively designated C1, C2 and C3, while the coils on the core 29 are designated D1, D2 and D3. Of these groups of the coils, one of each of the electromagnets is selected to produce a polarizing magnetic flux in the core structure. These coils may be the coils C1 and D1 on the respective electromagnets and these are excited by direct current of such magnitude as to produce the required magnitude of magnetic flux in the associated core. The coils C2 and C3 are utilized as the control torque coils and are excited through suitable circuit means hereinafter to be considered, which circuit means, in turn, is controlled by the output of the transformers A and B. Similarly, the coils D2 and D3 are the control torque coils of the electromagnet D and are also connected to be excited by the output of the mentioned circuit means under the control of the transformers. In general, the arrangement is such that for one polarity of output of the above-noted circuit means, the flux density in one core increases as that in the other core decreases with the result that a torque due to the unbalanced magnetic pull is developed about the axis Z—Z and the directivity sense is such that this torque is in opposition to the gyroscopic or precession torque about the axis Z—Z. When a condition of torque equilibrium is reached, the electrical quantities in the output circuit of the said circuit means are indicative of the angular velocity about the input axis of the gyroscope.

The circuit means employed in this control includes a plurality of electronic components. These various components represented, for example, in electronic tubes designated T, are secured as illustrated in Figs. 2 and 3 to the plate 25 which carries the transformers A and B. Such components are generally designated T only for the purpose of identification, and in view of the removal of the plate 25 from the structure illustrated in Fig. 1, do not appear in that illustration.

Figure 5:
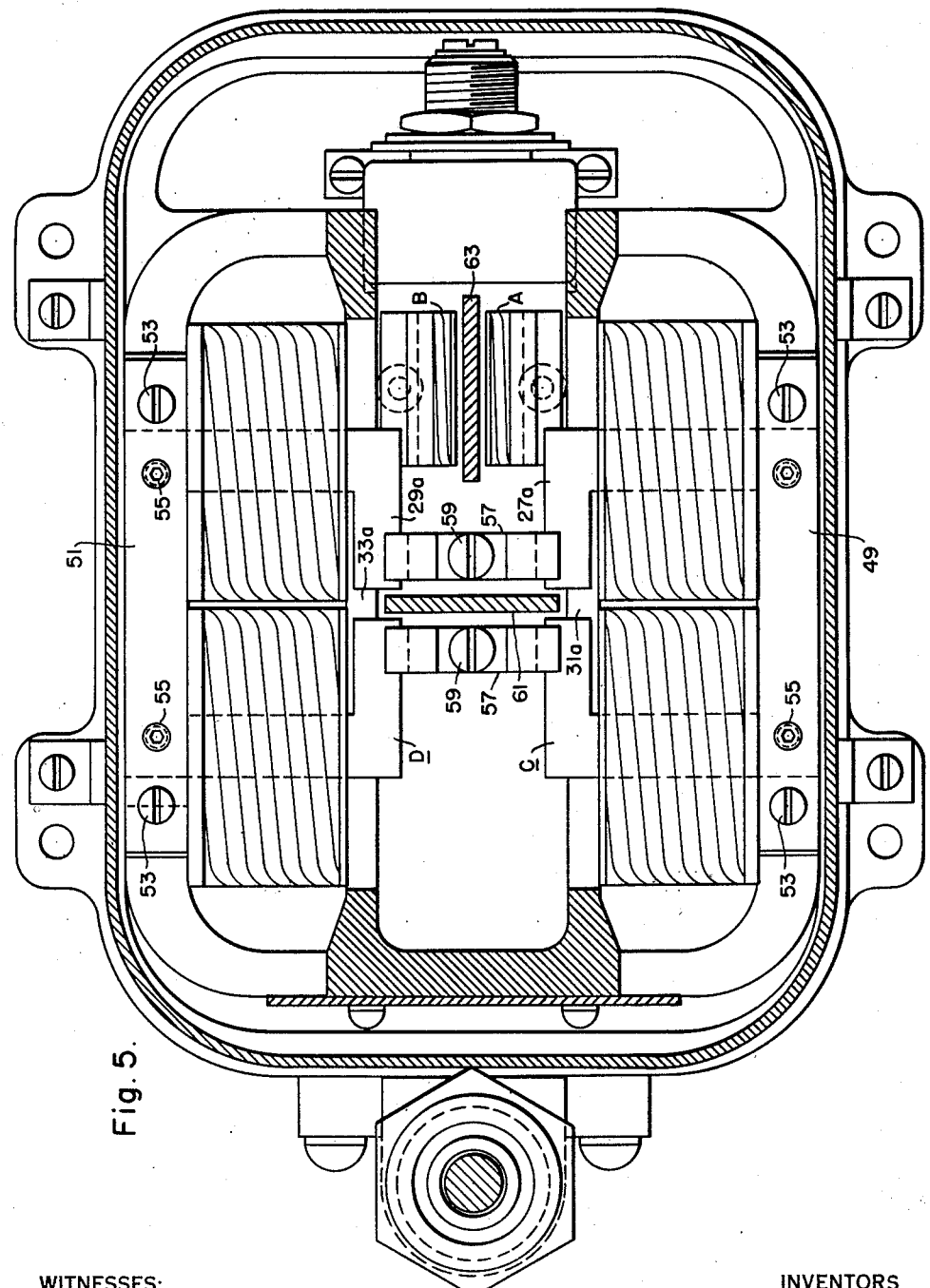
Fig. 5 is a sectional view taken on the line V—V of Fig. 4.
Figure 6:
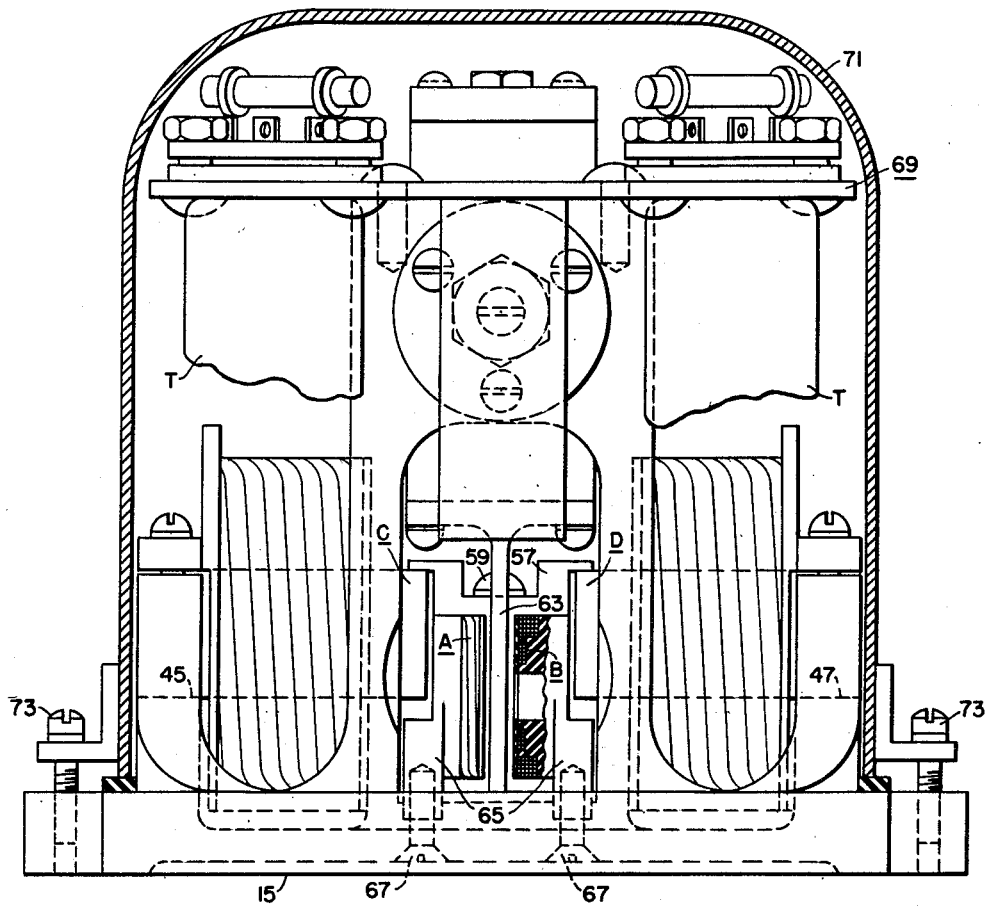
Fig. 6 is a view fragmentarily in section of one end of the gyroscope assembly illustrated in Fig. 4.

In the preferred embodiment of this invention illustrated in Figs. 4, 5 and 6, parts corresponding to those appearing in Figs. 1 through 3 bear like reference characters. The improvement in the structure of Figs. 4, 5 and 6 resides primarily in the electromagnetic biasing means. This biasing means as illustrated in the preferred embodiment, provides advantages both in the reduction of inertia about the output axis Z—Z and simplicity in manufacture. This improved biasing magnet system comprises a pair of C-shaped core members 27a and 29a for the respective electromagnets C and D. These core structures are each provided with airgaps 31a and 33a, which are formed by the flat confronting extremities of the core, and are each clamped in a suitable recess, respectively designated 45 and 47, formed in the base, by means of bars respectively designated 49 and 51 which straddle the ends of the cores and are secured by means of bolts 53 which clear through the ends of the bars and thread into the walls defining the sides of the recesses. Set screws 55 which thread through the bars over the respective cores, engage the cores and positively lock the cores in the recesses. The remaining extremities of the cores are secured in the recesses provided therefor by means of clamping members 57 of non-magnetic material which straddle the confronting ends of the respective cores and are secured with respect to the base by means of the screws 59 which clear therethrough and threadedly engage the base 15.

In clamped position, the corresponding faces of the respective airgaps lie in the same plane and the opposite edges of an armature 61 which projects downwardly from the gimbal 9A project into the respective airgaps. This armature which is of magnetizable material is of the form of a flat plate provided with a flange 63 at its upper extremity which seats on and straddles the gyro bearing cover plate 65. Thus, it will be appreciated that the armature plate 61 projects radially from the gimbal axis Z—Z and the plane of the plate occupies a position which is normal or perpendicular to the gimbal axis Z—Z.

In this illustration, the gimbal 9A occupies an angular position with respect to the base which is 90° displaced from that illustrated in Fig. 1. Thus, in the embodiment of Fig. 1, rotation of the gyro unit about the axis Y—Y is substantially in the plane of the base 15. In Fig. 5, however, this input axis is now displaced 90° from that of Fig. 1 due to the different orientation of tthe gyroscope assembly with respect to the base. As a consequence, the input axis instead of being perpendicular to the base as in Fig. 1 now lies substantially parallel to the base and thus the gyro must be mounted in a different manner with respect to the body in order to detect angular rates about a given axis of the body.

The opposite edges of the armature plate 61 project a short distance into the respective airgaps 31a and 33a.

Thus, upon rotation of the gyroscope about the output axis Z—Z, the armature is rotated further into one airgap and moved further out of the other airgap. At no time, is this displacement sufficient to completely move the armature out of one of the airgaps. In this illustrative example, as well as that of Figs. 1 through 3, it is to be appreciated that all of the airgap dimensions are exaggerated to simplify the illustration. In practice, the airgaps between the confronting faces of the core and the armature plate are of the order of a few thousandths of an inch. Similarly the extent of overlap of the faces is correspondingly small. However, in view of the feedback quantities which produce the biasing torques, the gyroscope is constrained in its annular movement about its output axis Z—Z, and consequently angular displacements of a degree or two about this axis are all that occur.

It is to be appreciated that by elimination of a beam such as 19, as illustrated in Fig. 2, the inertia of the gyro system about the output axis Z—Z is measurably reduced, and hence, the response about the axis to the gyroscopic torques which are available is measurably increased. Additionally, reduction of the moment of inertia of the assembly about the output axis also reduces the torque produced about the output axis by components of angular accelerations of the assembly about the output axis. Thus an important reduction in time delay is achieved. Additionally, it is a great deal easier to machine the various parts comprising the electromagnetic biasing system. For instance, the flat armature plate such as 61 is more easily manufactured than the arcuate armature plates 37 and 39 illustrated in Fig. 2. Similarly, it is easier to manufacture core structures having the flat confronting core extremities defining the airgaps 31a and 33a than it is to manufacture the radial airgap structure defining the airgaps 31 and 33.

The pick-off arrangement in this embodiment of the invention in principle is similar to that shown in Figs. 1 through 3, but is oriented somewhat differently as dictated by the geometry of the assembly to achieve a more compact and lighter design. In this illustration, a flat plate 63 of non-magnetic electrical conducting material projects downwardly from the bottom side of the gimbal 9a with its plane paralleling the gimbal axis Z—Z. Thus, the plane of the plate 63 is angularly displaced upon rotation of the gimbal about the gimbal axis. This angular displacement is detected by a pair of radio frequency transformers, again designated A and B, which comprise a primary winding and a secondary winding in each case, as in the illustration of Fig. 2. These radio frequency transformers are mounted in spaced relation with respect to the corresponding faces of the plate 63 on opposite sides of the plate, by means of supports 65 which are secured to the base 15 by screws 67. Again fragmentary details of the electronic equipment generally designated T are illustrated supported upon a plate 69 secured at the extremity of one of the supports 13a in which the gyro gimbal is journalled. The entire assembly is enclosed by a cover 71 provided with brackets at its base through which screws 73 clear and threadedly engage suitably threaded holes in the outer edges of the base 15.

As illustrated in Fig. 7, each of the electromagnets C and D in the embodiment of Figs. 4, 5 and 6 is provided with four coils. These coils are wound in concentric pairs on opposite legs of each of the cores 27a and 29a. In this application, the primary windings C1 are divided into two equal parts, as shown in Fig. 7, which are respectively mounted on the opposite legs of the corresponding core. Thus, the primary winding C1 comprises the two winding sections on the left and right-hand legs, as illustrated, and the primary winding D1 comprises the two winding sections on the left and right-hand legs of the other core. The primary windings are all connected in series and are energized by a supply of direct current indicated by the plus and minus signs adjacent the terminal ends of the primary winding circuit. Each of the four control torque coils, namely, the coils C2 and C3 on the electromagnet C and the coils D2 and D3 on the electromagnet D, have the same number of turns and, in the illustrated arrangement, the coil D2 is connected in series with the coil C3, while C2 is connected in series with the coil C3. These respective series circuits at one end are connected to the output of a differential amplifier designated DA. One output circuit DA1 of this amplifier is connected to the series circuit including the coils C2 and D3. The other output circuit DA2 is connected to the series circuit including the coils D2 and C3. The remaining ends of these two series circuits are bridged by a potentiometer designated P4, the end terminals of which are designated T1 and T2, and the center tap of which is connected to the B+ terminal of the differential amplifier by means of a circuit designated DAC.

The constant torque coils or polarizing coils C1 and D1 of the respective electromagnets have more turns than the individual control torque coils. That is to say, the sum of the turns of the two winding sections C1 is greater than the turns of either of the coils C2 or C3 on the same core, or, alternatively, the ampere turns of the constant torque coils are greater thn the ampere turns of either of the control torque coils associated therewith for a given maximum excitation of the control torque coils. Similar considerations apply to the coils of electromagnet D. More in detail, the excitation levels of the polarizing coils and the control torque coils are such that for a give number of turns of the constant torque coils with respect to the coil turns of either of the associated control torque coils and for a condition of maximum unbalance of the system, as caused by maximum measurable angular velocity at the input axis of the gyroscope, the flux produced by the polarizing coils is never completely bucked out in either magnetic circuit by action of the associated control torque coils. This insures operation of the magnetic material of the magnetic circuit over a linear B—H region and also eliminates operation over a region where the residual magnetism might give trouble. Magnetic materials having very low magnetic residual are, of course, preferred. The arrows adjacent the respective coils represent, for one of the several available flux relationships, the direction of the magnetic flux in the magnetic circuit produced by each coil. With respect to the polarizing coils, it will be appreciated that the magnetic fluxes are in series aiding relation around the corresponding magnetic circuit. However, with respect to the control torque coils, it will be seen that the fluxes produced thereby are in opposition in the magnetic circuit. Thus, assuming a condition of zero angular velocity at the input axis of the gyroscope, and further assuming that the electrical system is electrically symmetrical, the output voltages in the output circuits DA1 and DA2 will be equal. As a consequence, assuming perfect matching of the coils, the fluxes produced by the control torque coils will be balanced out in the respective magnetic circuits and no unbalanced magnetic condition will exist to exert a biasing torque about the gimbal axis of the gyroscope.

The electrical pick-up, represented in the radio frequency transformers A and B, is schematically illustrated in flux linkage, in Fig. 7, with the non-magnetic plate 63 of electrical conducting material. Radio frequency alternating current is supplied to the primary windings A1 and B1 connected in series with the output of an oscillator O. Oscillator O is designed to produce an output of essentially constant frequency and voltage. The secondary windings A2 and B2 respectively, are connected as adjacent legs in a bridge circuit comprising the potentiometers AP and BP in the remaining adjacent legs. In the circuit illustrated, rectification of the radio frequency voltage generated in the secondary windings A2 and B2 is provided by means of a pair of contact type rectifiers in series with the respective secondary windings in the bridge, which rectifiers are designated AR and BR, respectively. While this type of illustration has been chosen to represent the rectifiers, it will be apperciated that vacuum tube types of rectifiers are preferred in this application, each illustrated rectifier representing a rectifier network embodying a pair of tubes connected in back-to-back relation affording full-wave rectification of the individual secondary winding radio frequency voltages. This circuit, in addition to performing the function of a rectifier, functions also as a voltage doubling network in which tapped voltages taken from the respective potentiometers AP and BP are supplied to the control components at the input of the differential amplifier DA. This differential amplifier may include in its input a derivative network to which the direct current error voltage tapped from the potentiometers AP and BP is passed, and thereafter applied to a suitable voltage pre-amplifier. The output of this differential amplifier may include a conventional push-pull power amplifier where the D. C. error voltage is converted to a differential output current appearing in the output circuits including the circuits DA1, DA2 and the common circuit DAC. This differential current is thereafter applied to the series connected pairs of control torque coils of the electromagnetic biasing circuit which, together with the polarizing control afforded by the polarizing coils gives a control torque that is linear with differential current. Since this control torque is opposed to and balances the precession torque of the rate gyroscope, the differential current or voltage between the terminals T1 and T2, at the ends of the potentiometer P4, is directly proportional to the angular velocity about the input axis of the rate gyroscope. In this circuit arrangement, it is preferred that the respective coils be consistently placed in corresponding positions on the respective legs of the cores 27a and 29a for the purpose of achieving maximum electrical symmetry in control arrangement. For example, if the respective coils C1 are placed upon the core 27a within the respective coils C2 and C3, then it is preferred that the respective coils D1 be located concentrically within the respective coils D2 and D3. Thus, the mean length of the turns of the corresponding coils is maintained approximately the same so that the apparent resistance of the coils as they are connected in their respective circuits will be approximately the same, thereby minimizing asymmetrical electrical conditions resulting from the physical relationships of the various coils.

With regard to the coils illustrated in Fig. 2, it was earlier noted in these remarks that the coils C1 and D1 were the polarizing coils. In this arrangement, the physical relationship of the coils differs from that illustrated in the embodiment of Figs. 4 through 6, namely, in the provision of a single polarizing coil rather than the two section polarizing coils shown in Fig. 7. In this case, the polarizing coils are again preferably provided with sufficient ampere turns so that at no time will the flux produced thereby be completely bucked out by the flux of one of the associated control torque coils when excited by a condition of maximum unbalance.

The connection of the control torque coils of the embodiment illustrated in Fig. 2 is exactly the same as that illustrated in Fig. 7; that is, the coil C2 would be connected in series with the coil D3 and the coil D2 would be connected in series with the coil C3. The object of this cross connection of the coils in the embodiment of Fig. 2 is to balance the circuit resistances in the output circuits DA1 and DA2 of the differential amplifier. In Fig. 2, it will be noted that the mean length of the turns of the coil C2, for example, is shorter than the mean length of the turns of the coil C3. Similarly, the mean length of the turns of the coil D2 is shorter than the mean length of the turns of the coil D3. Thus, the electrical resistance of coil C2 will be less than that of coil C3, and similarly, the electrical resistance of the coil D2 will be less than that of the coil D3. Thus, by cross connecting D2 with C3 and C2 with D3, the series resistances will be a close approach to equality if care in manufacture of the respective coil assemblies is practiced. This precaution is not necessary in the circuit connections for the control torque coils of the embodiment of the invention illustrated in Figs. 4 through 6 because all of the control torque coils have essentially the same mean turn length.

In operation, when the output currents of the differential amplifier are equal, the flux of the coil D2 exactly balances that of the coil D3 and similarly, the flux of the coil C3 exactly balances that of the coil C2. As a consequence, the control torque coil flux in the respective magnetic circuits is zero, and since the system is designed so that the magnetic pulls, due to the respective polarizing coils C1 and D1 are balanced, it will be appreciated that no torque is applied tending to displace the armature 61 from its center position.

Assume now that there is an unbalanced condition where the current I1 doubles and the current I2 goes to zero, these currents being illustrated as arrows in opposite directions adjacent the potentiometer P4. Under this condition, the flux due to the coils C3 and D2 goes to zero. In the magnetic circuit C, the flux due to control torque coil C2 cancels a part of the polarizing flux due to the polarizing coils C1 in magnetic circuit D, the flux due to control torque coil D3 adds to that of the polarizing coils D1. As a consequence, the flux density in the electromagnet C decreases while the flux density in magnetic circuit D increases to its maximum value. Thus, a condition of maximum biasing torque exists to balance the precession torque of the gyro resulting from a maximum input rate to the gyroscope. In-between the two extreme conditions of balance and maximum unbalance hereinabove described is the normal working range of the electromagnetic biasing means or torque motor.

From the foregoing considerations, it is apparent that the electromagnetic biasing means or torque motor gives a net torque that is linear with both the differential current in the control torque coils and current in the polarizing coils and independent of the position of the armature 61 with respect to the respective cores within the desired region.

It will be appreciated by those skilled in the art that numerous detailed variations in the structural designs of this invention and in the arrangement of certain circuit components may be made without departing from the principles herein set forth. It is, therefore, intended that the foregoing disclosure and the showings made in the drawings shall be considered only as illustrative as in the principles of this invention and not interpreted in a limiting sense.

We claim as our invention:

1. In a system responsive to angular rates, the combination of, a gyroscope assembly comprising a rotor, a gimbal assembly journalling said rotor and a support journalling said gimbal assembly about a gimbal axis at right angles to the axis of said rotor, an armature member supported by said gimbal assembly to rotate therewith about said gimbal axis, a magnetic circuit including an airgap, means supporting said magnetic circuit with said armature member projecting into said airgap for movement transversely of said airgap upon rotation of said gimbal means, coil means on said magnetic circuit, a non-magnetic member of electrical conducting material supported on said gimbal means to rotate therewith about said gimbal axis, an inductance device stationarily disposed in spaced relation with said non-magnetic member in the path of movement thereof, circuit means for energizing said inductance device with alternating current, and circut means including rectifiers connecting said inductance device with said coil means to energize said coil means.

2. In a system responsive to angular rates, the combination of, a gyroscope assembly comprising a rotor, a gimbal assembly journalling said rotor and a support journalling said gimbal assembly about a gimbal axis at right angles to the axis of said rotor; an armature member supported by said gimbal assembly to rotate therewith about said gimbal axis, a magnetic circuit including an airgap, means supporting said magnetic circuit with said armature member projecting into said airgap for movement transversely of said airgap upon rotation of said gimbal means, coil means on said magnetic circuit, a non-magnetic member of electrical conducting material supported on said gimbal means to rotate therewith about said gimbal axis, a transformer having a primary and a secondary winding, means stationarily supporting said transformer in the path of movement of said non-magnetic member, circuit means for applying a high frequency alternating current to said primary winding, and circuit means including rectification means connecting said secondary winding to said coil means to energize said coil means.

3. In a system responsive to angular rates, the combination of, an angular rate responsive device comprising an output member pivotally mounted about an output axis for producing an output torque proportional to the angular rate to be measured, electromagnetic biasing means comprising a magnetic circuit having an airgap therein, coil means on said magnetic circuit, and an armature connected to said output member for movement within said airgap in a direction paralleling the faces thereof; a non-magnetic member of electrical conducting material supported on said output member to rotate therewith about said output axis, an inductance device stationarily disposed in spaced relation with said non-magnetic member in the path of movement thereof, circuit means for energizing said inductance device with alternating current, and circuit means connecting said inductance device to said coil means to energize said coil means.

4. In a system responsive to angular rates, the combination of, an angular rate responsive device comprising an output member pivotally mounted about an output axis for producing an output torque proportional to the angular rate to be measured, electromagnetic biasing means comprising a magnetic circuit having an airgap therein, coil means on said magnetic circuit, and an armature connected to said output member for movement within said airgap in a direction paralleling the faces thereof; a non-magnetic member of electrical conducting material supported on said output member to rotate therewith about said output axis, a transformer having a primary and a secondary winding, means stationarily supporting said transformer in the path of movement of said non-magnetic member, circuit means for applying a high frequency alternating current to said primary winding, and circuit means connecting said secondary winding to said coil means to energize said coil means.

5. In a system responsive to angular rates, the combination of, a gyroscope having a rotor, gimbal means journalling said rotor, and support means journalling said gimbal means about a gimbal axis at right angles to the axis of said rotor; a pair of electromagnetic members, each comprising a core and coil means mounted on each core, each core having an airgap therein, armature means for said electromagnetic members, means supporting said armature means on said gimbal means to move therewith about said gimbal axis, means stationarily securing said electromagnetic members in geometrically opposite positions with said armature means disposed in each of said airgaps for movement transversely therethrough in opposite directions upon rotation of said gimbal means, circuit terminals connected with corresponding portions of each coil means for receiving connections for the application of direct current to said portions of said coil means, electrical pickup means responsive to angular displacement of said gimbal means about said gimbal axis for producing an electrical quantity in dependence of said angular displacement, and circuit means connecting said electrical pickup means with the remaining portions of the coil means of each electromagnetic means for energizing said remaining portions in opposite senses.

6. In a system responsive to angular rates, the combination of, a gyroscope having a rotor, gimbal means journalling said rotor, and support means journalling said gimbal means about a gimbal axis at right angles to the axis of said rotor; a pair of electromagnetic members, each comprising a core and coil means mounted on each core, each core having an airgap therein, armature means for said electromagnetic members, means supporting said armature means on said gimbal means to move therewith about said gimbal axis, means stationarily securing said electromagnetic members in geometrically opposite positions with said armature means disposed in each of said airgaps for movement transversely therethrough in opposite directions upon rotation of said gimbal means, circuit terminals connected with corresponding portions of each coil means for receiving connections for the application of direct current to said portions of said coil means, a non-magnetic member of electrical conducting material secured to said gimbal means to rotate therewith about said gimbal axis, said non-magnetic member projecting substantially radially from said gimbal means, a pair of inductance devices, means supporting said inductance devices on opposite sides of said non-magnetic member in the path of movement thereof, circuit terminals connected with corresponding portions of said inductance devices for receiving connections for the application of alternating current thereto, and circuit connections including rectification means connecting the remaining portions of said inductance devices with the remaining portions of said coil means for energizing said remaining portions of said coil means in opposite senses.

7. In a system responsive to angular rates, the combination of, a gyroscope having a rotor, gimbal means journalling said rotor, and support means journalling said gimbal means about a gimbal axis at right angles to the axis of said rotor; a pair of electromagnetic members, each comprising a core and coil means mounted on each core, each core having an airgap therein, armature means for said electromagnetic members, means supporting said armature means on said gimbal means to move therewith about said gimbal axis, means stationarily securing said electromagnetic members in geometrically opposite positions with said armature means disposed in each of said airgaps for movement transversely therethrough in opposite directions upon rotation of said gimbal means, circuit terminals connected with corresponding portions of each coil means for receiving connections for the application of direct current to said portions of said coil means, a non-magnetic member of electrical conducting material secured to said gimbal means to rotate therewith about said gimbal axis, said non-magnetic member projecting substantially radially from said gimbal means, a pair of transformers each having primary and a secondary winding, circuit terminals on each primary winding for connecting the primary windings to a supply of radio frequency alternating current, a rectifier circuit connected with said secondary windings for producing an output voltage of one polarity or the reverse depending upon which of said secondary windings is of the higher voltage, circuit terminals connected with the remaining portion of each coil means dividing each remaining portion into two coil sections, a differential amplifier connected with said rectifier circuit and having a pair of output circuits, and circuit means connecting corresponding winding sections of the respective coil means in series with the respective output circuits.

8. In a gyroscope assembly, the combination of, a bearing structure, a gimbal journalled in said bearing structure for rotation about a gimbal axis, a rotor journalled in said gimbal with the spin axis thereof at right angles to said gimbal axis, a flat plate of magnetizable material secured to rotate with said gimbal, said flat plate projecting radially from said gimbal axis with the plane of said plate normal to said gimbal axis, a pair of electromagnetic devices each comprising a C-shaped core structure having an airgap therein, means stationarily securing each electromagnetic device with respect to said flat plate with opposite edges of said flat plate projecting into the respective airgaps, and coil means on each C-shaped core structure for producing flows of magnetic flux in each C-shaped core structure upon energization of said coil means.

9. In a gyroscope assembly, the combination of, a bearing structure, a gimbal journalled in said bearing structure for rotation about a gimbal axis, a rotor journalled in said gimbal with the spin axis thereof at right angles to said gimbal axis, a plate of magnetizable material secured to rotate with said gimbal, said plate projecting radially from said gimbal axis with the plane of said plate normal to said gimbal axis, a pair of electromagnetic devices each comprising a core structure having an airgap therein, means stationarily securing each electromagnetic device with respect to said plate with opposite edges of said plate projecting into the respective airgaps, coil means on each core structure for producing flows of magnetic flux in each core structure upon energization of said coil means, and an electrical pickup device responsive to movement of said gimbal about said gimbal axis for energizing said coil means in opposite senses.

10. In a gyroscope assembly, the combination of, a bearing structure, a gimbal journalled in said bearing structure for rotation about a gimbal axis, a rotor journalled in said gimbal with the spin axis thereof at right angles to said gimbal axis, a plate of magnetizable material secured to rotate with said gimbal, said plate projecting radially from said gimbal axis with the plane of said plate normal to said gimbal axis, a pair of electromagnetic devices each comprising a core structure having an airgap therein, means stationarily securing each electromagnetic device with respect to said plate with opposite edges of said plate projecting into the respective airgaps, coil means on each core structure for producing flows of magnetic flux in each core structure upon energization of said coil means, a non-magnetic plate of electrical conducting material secured to rotate with said gimbal, said non-magnetic plate projecting radially of said gimbal axis and the plane thereof paralleling said gimbal axis, a pair of inductive devices disposed, respectively, on opposite sides of said non-magnetic plate in the path of movement thereof, and circuit terminals connected with each inductance device to receive connections for the application of alternating current thereto.

11. In a gyroscope assembly, the combination of, a bearing structure, a gimbal journalled in said bearing structure for rotation about a gimbal axis, a rotor journalled in said gimbal with the spin axis thereof at right angles to said gimbal axis, a plate of magnetizable material secured to rotate with said gimbal, said plate projecting radially from said gimbal axis with the plane of said plate normal to said gimbal axis, a pair of electromagnetic devices each comprising a core structure having an airgap therein, means stationarily securing each electromagnetic device with respect to said plate with opposite edges of said plate projecting into the respective airgaps, coil means on each core structure for producing flows of magnetic flux in each core structure upon energization of said coil means, a non-magnetic plate of electrical conducting material secured to rotate with said gimbal, said non-magnetic plate projecting radially of said gimbal axis and the plane thereof paralleling said gimbal axis, a pair of high frequency transformers each comprising a primary winding and a secondary winding, means supporting said transformers, respectively, on opposite sides of said non-magnetic plate in the path of movement thereof, said primary windings being adapted to have radio frequency currents applied thereto.

References Cited in the file of this patent

UNITED STATES PATENTS

| | | |
|---|---|---|
| 1,308,693 | Beattie | July 1, 1919 |
| 2,274,443 | Fischer | Feb. 24, 1942 |
| 2,349,287 | Krussmann | May 23, 1944 |

FOREIGN PATENTS

| | | |
|---|---|---|
| 419,179 | France | Dec. 28, 1910 |